United States Patent
Kawano et al.

(12)

(10) Patent No.: US 6,195,141 B1
(45) Date of Patent: Feb. 27, 2001

(54) HAND-HELD CONTROL DEVICE

(75) Inventors: Takayuki Kawano; Masafumi Ushijima; Mikio Oshima, all of Fukuoka (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 0 days.

(21) Appl. No.: 09/142,911
(22) PCT Filed: Jan. 19, 1998
(86) PCT No.: PCT/JP98/00179
 § 371 Date: Sep. 18, 1998
 § 102(e) Date: Sep. 18, 1998
(87) PCT Pub. No.: WO98/31513
 PCT Pub. Date: Jul. 23, 1998

(30) Foreign Application Priority Data

Jan. 20, 1997 (JP) .................................................. 9-022105

(51) Int. Cl.[7] .................................................. G02F 1/1333
(52) U.S. Cl. .................................. 349/58; 361/681; 345/87
(58) Field of Search .............................. 345/169; 364/700; 361/681, 682, 686; 349/58, 60

(56) References Cited

U.S. PATENT DOCUMENTS

Re. 32,365 * 3/1987 Sebestyen ............................ 345/169
4,005,388 * 1/1977 Morley et al. ....................... 345/169
5,400,160   3/1995 Takahashi .

FOREIGN PATENT DOCUMENTS

| 1157935 | 8/1997 | (CN) . |
| 63-64022 | 3/1988 | (JP) . |
| 2-88190 | 3/1990 | (JP) . |
| 4-40221 U | 4/1992 | (JP) . |
| 4-57821 U | 5/1992 | (JP) . |
| 5-66825 | 3/1993 | (JP) . |

* cited by examiner

Primary Examiner—Richard A. Hjerpe
Assistant Examiner—Ronald Laneau
(74) Attorney, Agent, or Firm—Morgan, Lewis & Bockius LLP

(57) ABSTRACT

A hand-held control device comprises a casing (1) having a plurality of operating switches (21) and a cut hole (3) in front face thereof, a transparent window (5) fitted in the cut hole (3) of the casing (1), a printed circuit board (6) accommodated in the casing (1) and connected to the operating switches (21), a crystal liquid display plate (7) disposed near the window (5) of the casing (1) and connected to the printed circuit board (6) through a connector (8), the crystal liquid display plate (7) being fixed with a mounting member (10) so as to the connector (8) is sandwiched between the mounting member (10) and the printed circuit board (6), and an upper cover (17) and a lower cover (14) for holding the printed circuit board (6) through the buffer member (10). Accordingly, even when an impact is applied onto the casing (1), the liquid crystal display plate (7) is less affected thereby, and therefore the contents of display can be surely displayed on the liquid crystal display plate (7).

3 Claims, 3 Drawing Sheets

HAND-HELD CONTROL DEVICE

TECHNICAL FIELD

The present invention relates to a hand-held control device having a variety of switches to operate, for instance, an industrial robot.

BACKGROUND ART

A conventional hand-held control device is shown in FIGS. 5 and 6.

In those figures, reference numeral 30 designates a casing of resin material such as plastics. The casing 30 comprises a cup-shaped upper casing 30a, and a lower casing 30b which covers the upper casing 30a. Reference numeral 31 designates a cut hole formed in the bottom of the upper casing 30a. The cut hole 31 is surrounded by a flange 32. Reference character 32a denotes mounting seats provided at four outer corners of the flange 32, each of which has a tap hole 32b. Reference numeral 33 designates a window of a transparent material such as acrylic material which is bonded to the aforementioned flange 32. Reference numeral 34 designates a printed circuit board on which electronic devices are mounted so that they are electrically connected to one another. The printed circuit board is secured to mounting seats 32a with screws 32c. Reference numeral 35 denotes a liquid crystal display plate. The sides of the liquid crystal display plate 35 is secured through a connector 37 to the printed circuit board 34 with support members 36. Reference numeral 38 designates a control device which is mounted on the printed circuit board 34, and controls display contents which are to be displayed on the liquid crystal display plate 35. Reference numeral 39 designates operating switches mounted on the upper casing 30a; and 40, a printed circuit board which is mounted on the upper casing 30a and connected to the operating switches 39.

The above-described hand-held control device suffers from the following difficulties: When the hand-held control device is dropped, or struck against something; that is, when an impact is applied onto it, the casing 30 is bent, and the shock is transmitted to the printed circuit board 34 in the casing 30. As a result, the shock shifts the connecting position of the printed circuit board 34 and the liquid crystal display plate 35 connected through the connectors 37 thereto, so that the connection of the liquid crystal display plate 35 to the printed circuit board 35 becomes unsatisfactory; that is, no display is made on the liquid crystal display plate 35.

Accordingly, an object of the present invention is to provide a hand-held control device in which, even if an impact is applied onto the casing, the connecting position of the printed circuit board and the liquid crystal display plate is not shifted, and therefore a display is made on the liquid crystal display plate positively.

DISCLOSURE OF THE INVENTION

What is disclose present invention is a hand-held control device which is electrically connected to a control board with a cable, and is operated at a position far away from the control board. The hand-held control device comprises: a casing having a plurality of operating switches and a cut hole; a transparent window fitted in the cut hole of the casing; a printed circuit board accommodated in the casing and connected to the operating switches; a crystal liquid display plate disposed near the window of the casing and connected to the printed circuit board through a connector, the crystal liquid display plate being fixed with a mounting member so as to the connector is sandwiched between the mounting member and the printed circuit board; and an upper cover and a lower cover which hold the printed circuit board through a buffer member.

Furthermore, the present invention discloses a hand-held control device which is electrically connected to a control board with a cable, and is operated at a position far away from the control board comprising: a casing having a plurality of operating switches and a cut hole; a transparent window fitted in the cut hole of the casing; a liquid crystal display unit accommodated in the casing which includes a liquid crystal display plate and a printed circuit board connected to the operating switches; a buffer member provided both sides of the liquid crystal display unit; and a cover for holding the liquid crystal display unit together with the window through the buffer member, the cover being secured to the casing.

According to the present invention, the printed circuit board 6 is secured to the casings 1a and 1b through the buffer members 20. Hence, even if an impact is applied onto the casings 1a and 1b, no shock is propagated over to the printed circuit board 6; that is, the printed circuit board 6 and the liquid crystal display plate are not shifted from each other. Accordingly, even if an impact is applied onto the casing, the liquid crystal display plate is less affected thereby; that is, the contents of display can be surely displayed on the liquid crystal display plate 7.

The liquid crystal display unit 70 is not directly secured to the upper casing, that is, it is held between the cover 22 and the window through the buffer members 25 and 26. Accordingly, the cost for replacing the liquid crystal display unit 7 is can be reduced, and with one casing, a variety of liquid crystal display units can be used with ease.

BRIEF DESCRIPTION OF THE ACCOMPANYING DRAWINGS

BEST MODE FOR CARRYING OUT THE INVENTION

Embodiments of the present invention will be described with reference to the accompanying drawings.

Figure 1:
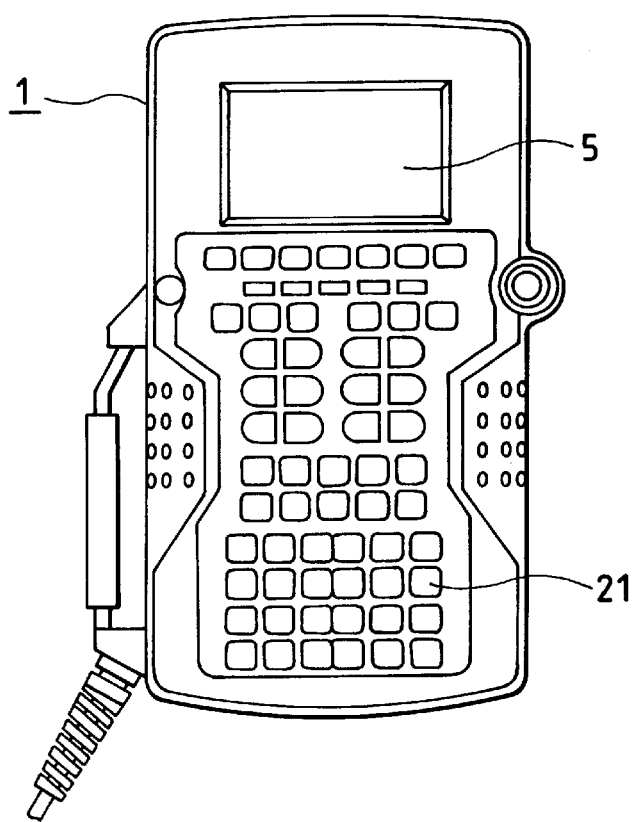
FIG. 1 is a front view of a hand-held control device according to a first embodiment of the present invention.
Figure 2:
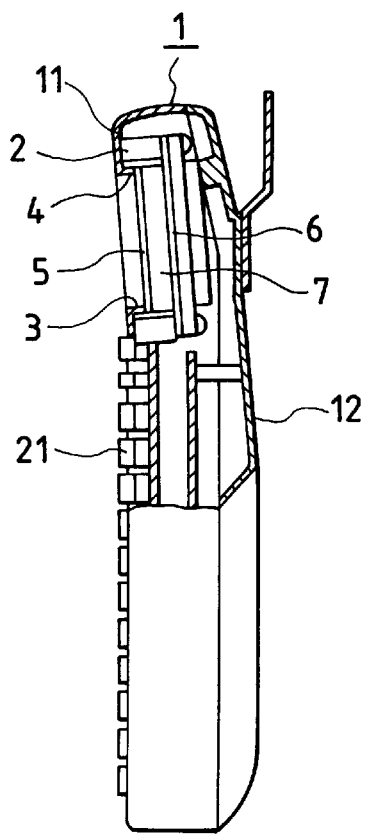
FIG. 2 is a sectional side view showing the hand-held control device of the first embodiment.
Figure 3:
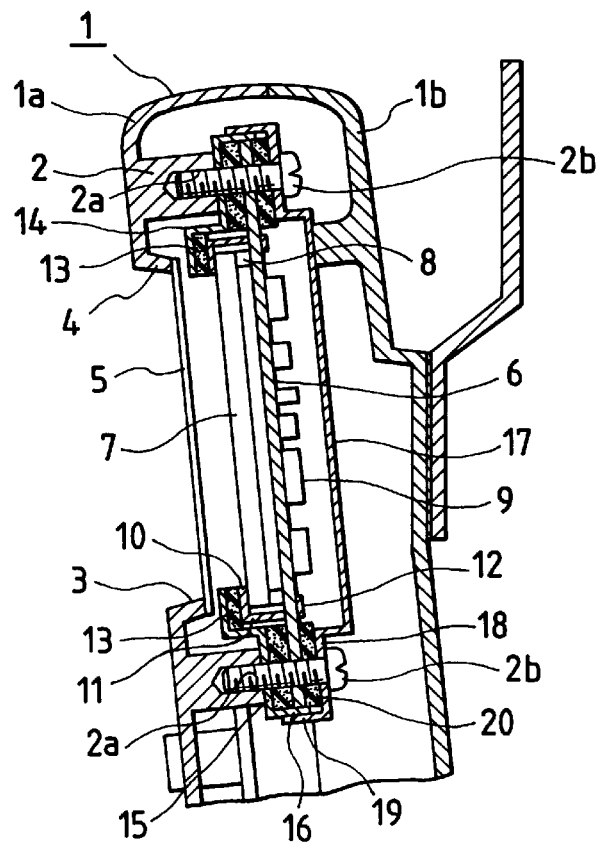
FIG. 3 is an enlarged illustration showing essential parts of the hand-held control device shown in FIG. 2.

FIG. 1 is a front view of a hand-held control device according to a first embodiment of the present invention. FIG. 2 is a sectional side view of the hand-held control device of the embodiment. FIG. 3 is an enlarged view showing essential parts of the hand-held-control device shown in FIG. 2.

In those figures, reference numeral 1 designates a hand-held control device casing of resin material such as plastic material. The casing 1 comprises a cup-shaped upper casing 1a, and a lower casing 1b which covers the upper casing 1a. Reference numeral 2 designates a mounting seat formed on the upper casing 1a; and 2a, tap holes formed in the mounting seat. Reference numeral 3 designates a cut hole formed in the bottom of the upper casing 1a. A flange 4 is integrally formed with the upper casing 1a so as to surround the cut hole 3. The mounting seat 2 is provided outside the flange 4. Reference numeral 5 is a transparent window made of a material such as acrylic material. The window 5 is bonded to the flange 4 with adhesive agent. Reference numeral 6 designates a printed circuit board on which electronic devices are mounted in such a manner that the latter are electrically connected to one another. Reference numeral 7 designates a liquid crystal display plate which is connected through a connector 8 to the wiring pattern of the printed circuit board 6. Reference numeral 9 designates a control device which is mounted on the printed circuit board 6 and is adapted to control the contents of display on the liquid crystal display plate 7. Reference numeral 10 denotes a mounting member adapted to mount the liquid crystal display plate 7 on the printed circuit board 6. The mounting member 10 has a square hole at the center, and has bent pieces 11 formed by bending side portions thereof. Engaging pieces 12 are protruded from the bending pieces 11, and the engaging pieces 12 are inserted into holes provided in the printed circuit board 6. The engaging pieces 12 protruded from the printed circuit board 6 are bent to fix the liquid crystal display plate 7 to the printed circuit board 6. Reference numeral 13 designates a square frame-shaped buffer member made of an elastic material such a neoprene sponge. Reference numeral 14 denotes an lower cover having a square hole at the center. The lower cover 14 has flanges 15 formed by bending the side portions thereof. The ends of the flanges 15 are bent at right angles to form protruded pieces 16. The lower cover 14 is pushed against the aforementioned mounting member 10 through the buffer member 13. Reference numeral 17 designates an upper cover. The upper cover 17 has flanges 18 formed by bending side portions thereof, and the end portions of the flanges 18 are bent at right angles to form protruded pieces 19. Reference numeral 20 designates a square frame-shaped buffer member. The buffer member 20 is made of an elastic material such as neoprene sponge rubber. Reference numeral 21 designates operating switches mounted on the casing 1.

The above-described hand-held control device is assembled in such a manner as follows:

(1) bonding the window 5 to the flange 4 of the upper casing 1a with adhesive agent;

(2) mounting the control device 9 on the printed circuit board 6, disposing the liquid crystal display plate 7 thereon, and under this condition, securing the mounting member 10 to the printed circuit board 6 to fix the liquid crystal display plate 7 therebetween;

(3) providing the buffer member 13 on the mounting member 10, mounting the lower cover 14 so as to cover the buffer member 13, disposing the buffer member 20 inside of the flanges 15 of the lower cover 14, and abutting the buffer member 20 against one surface of the printed circuit board 6 with the lower cover 14;

(4) disposing the buffer member 20 inside of the flanges 18 of the upper cover 17, abutting the buffer member 20 against the other surface of the printed circuit board 6 with the upper cover 17, under this condition, the printed circuit board 6 is held between the lower cover 14 and the upper cover 17 through the buffer members 20, and then securing the printed circuit board 6 with the upper cover 17 by screwing the screws 2b into the tap holes 2a of the mounting seat 2; and (5) combining the lower casing 1b with the upper casing 1a to form the casing 1 of the hand-held control device.

In this embodiment, the printed circuit board 6 with the liquid crystal display plate 7 is secured to the casings 1a and 1b, more specifically, the printed circuit board 6 is held between the lower cover 14 and the upper cover 17 through the buffer members 20. Hence, even when an impact is applied onto the casings 1a and 1b, the shock is not propagated over to the printed circuit board 6. Accordingly, the contents of display is displayed on the liquid crystal display plate 7 at all times which is mounted through the connector 8 to the printed circuit board 6.

Figure 4:
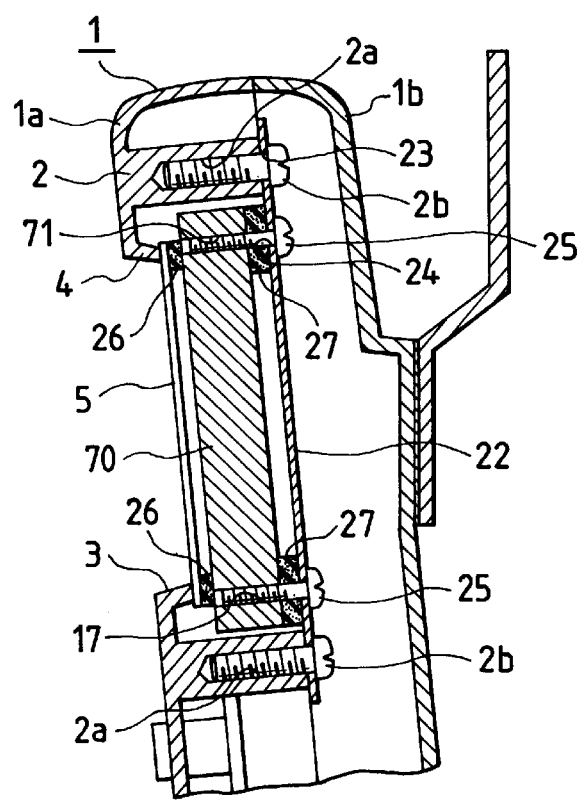
FIG. 4 is an enlarged sectional side view showing essential parts of the hand-held control device according to a second embodiment of the present invention.
Figure 5:
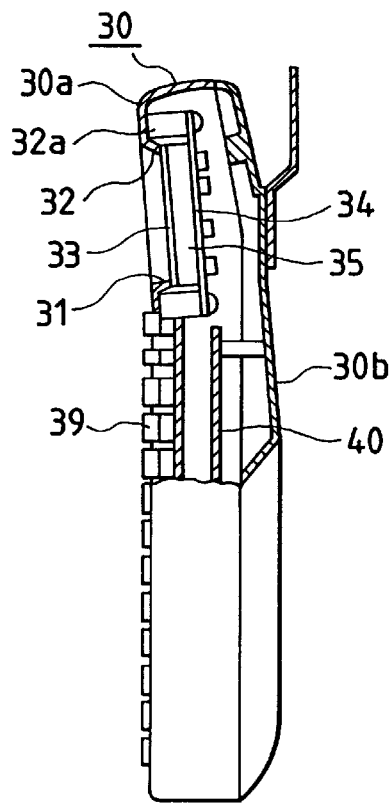
FIG. 5 is a sectional side view of a conventional hand-held control device.
Figure 6:
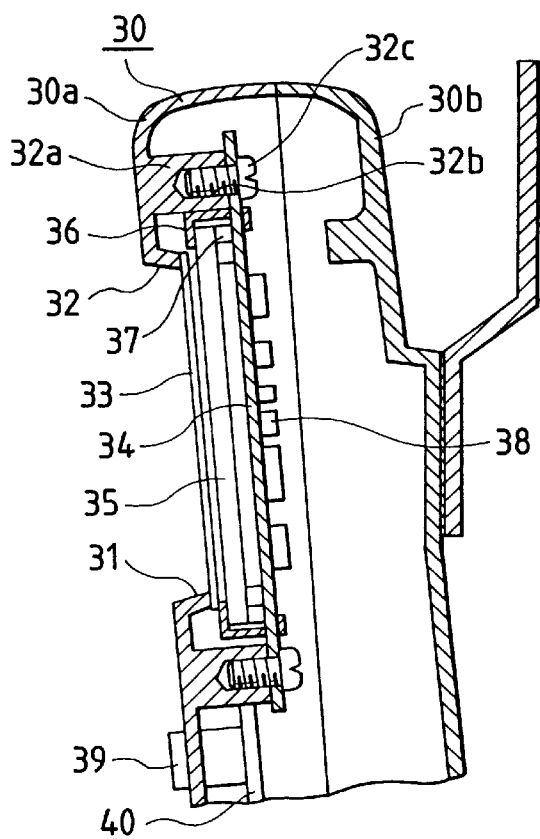
FIG. 6 is an enlarged illustration showing essential parts of the conventional hand-held control device shown in FIG. 5.

FIG. 4 is an enlarged illustration showing essential parts of the hand-held control device according to a second embodiment of the present invention.

The second embodiment comprises members which is substantially equal to the above-described first embodiment, namely, a casing 1, an upper casing 1a, a lower casing 1b, a mounting seat 2, a cut hole 3, a flange 4, a window 5, a printed circuit board 6, a liquid crystal display plate 7, a connector 8, and a control device 9. The second embodiment is different from the first embodiment in that a liquid crystal display unit 70 includes a printed circuit board 6 and a liquid crystal display plate 7 which are provided as one unit, and the liquid crystal display unit 70 is mounted on the upper casing 1a.

In FIG. 4, reference numeral 22 designates a cover mounted on the mounting seat 2; 23, mounting holes which are equal in pitch position to the tap holes 2a; and 24, tap holes which are provided equal in pitch position to a plurality of positioning holes 71 of the liquid crystal display unit 70. The tap holes 24 are provided different in pitch position from the mounting holes 23. Positioning pins 25, whose ends are smaller in diameter than the positioning holes 71, are screwed into the tap holes 24. Reference numeral 26 denotes a square frame-shaped buffer member disposed between the window 5 and the liquid crystal display plate unit 70. The buffer member 26 is made of elastic material such as neoprene sponge rubber. Reference numeral 27 designates a square frame-shaped buffer member disposed between the printed circuit board 6 and the cover 22.

The hand-held control device is assembled in such a manner as follows:

(1) bonding the buffer member 26 to the window with adhesive agent;

(2) bonding the window 5 to the flange 4 of the upper casing 1a with adhesive agent;

(3) bonding the buffer member 27 to the cover 22 with adhesive agent;

(4) disposing the liquid crystal display unit 70 on the cover 22 with the positioning pins 25 as guides which have been screwed into the cover 22;

(5) mounting the cover 22 together with the liquid crystal display unit 70 on the mounting seat 2, and screwing the screws 2b into the tap holes 2a to fix the cover 22 to the upper casing 1a through the mounting seat 2, wherein, the liquid crystal display unit 70 is securely held between the window 5 and the cover 22 through the buffer members 26 and 27; and (6) combining the lower casing 1b with the upper casing 1a to form the casing 1 of the hand-held control device.

In this embodiment, both sides of the liquid crystal display unit 70 are secured to the upper casing 12a while being held between the buffer members 26 and 27. Therefore, even if an impact is applied onto the casings 1a and 1b, the shock will not be propagated to the liquid crystal display unit 70.

The positioning holes 71 for positioning the liquid crystal display unit 70 are different in pitch from the screw 2b used to secure the cover 22 to the mounting seat 2, and the liquid crystal display unit 70 is not directly secured to the upper casing 1a; that is, it is held between the cover 22 and the window 5 through the buffer members 26 and 27.

Hence, when a different liquid crystal display unit 70 having different positioning holes in pitch is employed, it is unnecessary to change the configuration of the upper casing 1a. Namely, all that is necessary to open new tap holes 24 in the cover 24. Accordingly, the cost for replacing the liquid crystal display unit 70 can be reduced extremely, that is, one casing can be used for a variety of liquid crystal display units.

POSSIBILITY OF INDUSTRIAL APPLICATION

According to the present invention, even when an impact is applied onto the casing, the liquid crystal display member is less affected. In addition, the technical concept of the present invention is applicable to a hand-held control device with a little cost which uses a variety of liquid crystal display members.

What is claimed is:

1. A hand-held control device which is electrically connected to a control board with a cable, and is operated at a position far away from the control board, wherein
   the hand-held control device comprises:
   a casing having a plurality of operating switches and a cut hole in a front face thereof;
   a transparent window fitted in the cut hole of the casing;
   a printed circuit board accommodated in the casing and connected to the operating switches;
   a liquid crystal display plate disposed near the window of the casing and connected to the printed circuit board through a connector, the liquid crystal display plate being fixed with a mounting member to the printed circuit board so the connector is sandwiched between the mounting member and the printed circuit board;
   first and second buffer members formed of elastic material;
   an upper cover and a lower cover, and said lower cover being positioned to press said first buffer member against said mounting member on one side of said printed circuit board and said upper cover being positioned to press said second buffer member against an opposite side of said printed circuit board for holding the printed circuit board through the first and second buffer members.

2. A hand-held control device which is electrically connected to a control board with a cable, and is operated at a position far away from the control board, wherein
   the hand-held control device comprises:
   a casing having a plurality of operating switches and a cut hole in a front face thereof;
   a transparent window fitted in the cut hole of the casing;
   a liquid crystal display unit accommodated in the casing, said liquid crystal display unit including a liquid crystal display plate and a printed circuit board connected to the operating switches;
   first and second buffer members being provided on both sides of the liquid crystal display unit, said first buffer member being positioned between said transparent window and one side of said liquid crystal display unit and
   a cover pressing the second buffer member against the opposite side of said liquid crystal displav unit for holding the liquid crystal display unit together with the window through the buffer members, the cover being secured to the casing.

3. The hand-held control device as set forth in claim 2, wherein a plurality of positioning pins are provided on the cover at a predetermined pitch, a plurality of positioning holes which are equal in pitch to the positioning pins and larger in diameter than the positioning pins are formed in the liquid crystal display unit.

* * * * *